(12) United States Patent
Tanonaka et al.

(10) Patent No.: US 6,928,088 B2
(45) Date of Patent: Aug. 9, 2005

(54) TRANSMISSION APPARATUS

(75) Inventors: Koji Tanonaka, Kawasaki (JP); Naoto Kidoku, Kawasaki (JP); Motoshi Hamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 801 days.

(21) Appl. No.: 09/813,227

(22) Filed: Mar. 20, 2001

(65) Prior Publication Data

US 2002/0027903 A1 Mar. 7, 2002

(30) Foreign Application Priority Data

Sep. 6, 2000 (JP) ........................................ 2000-270733

(51) Int. Cl.[7] .................................................. H04J 3/06
(52) U.S. Cl. ...................................... 370/503; 370/389
(58) Field of Search ................................. 370/252, 389, 370/369, 359–360, 395.1, 412, 458, 498, 503–520

(56) References Cited

U.S. PATENT DOCUMENTS 6,041,066 A * 3/2000 Meki et al. ................. 370/512

6,185,247 B1 * 2/2001 Williams et al. ............ 375/212
2004/0148437 A1 * 7/2004 Tanonaka ................... 709/246

FOREIGN PATENT DOCUMENTS

JP 11127128 5/1999

* cited by examiner

*Primary Examiner*—David Vincent
(74) *Attorney, Agent, or Firm*—Katten Muchin Rosenman LLP (57) ABSTRACT

A transmission apparatus utilizing an SDH is provided. The transmission apparatus includes a processing unit controlling the transmission apparatus, an SSM extraction unit extracting a first SSM from an input signal, and a selector selecting either of the first SSM and a second SSM set by the processing unit. The transmission apparatus can add an incoming SSM function, for instance, to an external 2 Mbps SSM function in addition to an assumed SSM function. Accordingly, the transmission apparatus can conform to the ITU-T G.781 Recommendation by utilizing a related-art synchronization function.

6 Claims, 13 Drawing Sheets

| | SUB MULTI-FRAME (SMF) | FRAME NUMBER | BITS 1 TO 8 OF FRAME | | | | | | | |
|---|---|---|---|---|---|---|---|---|---|---|
| | | | 1 | 2 | 3 | 4 | 5 | 6 | 7 | 8 |
| MULTI-FRAME | I | 0 | C1 | 0 | 0 | 1 | 1 | 0 | 1 | 1 |
| | | 1 | 0 | 1 | A | $Sa_{41}$ | $Sa_{51}$ | $Sa_{61}$ | $Sa_{71}$ | $Sa_{81}$ |
| | | 2 | C2 | 0 | 0 | 1 | 1 | 0 | 1 | 1 |
| | | 3 | 0 | 1 | A | $Sa_{42}$ | $Sa_{52}$ | $Sa_{62}$ | $Sa_{72}$ | $Sa_{82}$ |
| | | 4 | C3 | 0 | 0 | 1 | 1 | 0 | 1 | 1 |
| | | 5 | 1 | 1 | A | $Sa_{43}$ | $Sa_{53}$ | $Sa_{63}$ | $Sa_{73}$ | $Sa_{83}$ |
| | | 6 | C4 | 0 | 0 | 1 | 1 | 0 | 1 | 1 |
| | | 7 | 0 | 1 | A | $Sa_{44}$ | $Sa_{54}$ | $Sa_{64}$ | $Sa_{74}$ | $Sa_{84}$ |
| | II | 8 | C1 | 0 | 0 | 1 | 1 | 0 | 1 | 1 |
| | | 9 | 1 | 1 | A | $Sa_{41}$ | $Sa_{51}$ | $Sa_{61}$ | $Sa_{71}$ | $Sa_{81}$ |
| | | 10 | C2 | 0 | 0 | 1 | 1 | 0 | 1 | 1 |
| | | 11 | 1 | 1 | A | $Sa_{42}$ | $Sa_{52}$ | $Sa_{62}$ | $Sa_{72}$ | $Sa_{82}$ |
| | | 12 | C3 | 0 | 0 | 1 | 1 | 0 | 1 | 1 |
| | | 13 | E1 | 1 | A | $Sa_{43}$ | $Sa_{53}$ | $Sa_{63}$ | $Sa_{73}$ | $Sa_{83}$ |
| | | 14 | C4 | 0 | 0 | 1 | 1 | 0 | 1 | 1 |
| | | 15 | E2 | 1 | A | $Sa_{44}$ | $Sa_{54}$ | $Sa_{64}$ | $Sa_{74}$ | $Sa_{84}$ |

TRANSMISSION APPARATUS

BACKGROUND OF THE INVENTION

1. Field of the Invention

The present invention relates to a transmission apparatus, and more particularly relates to a transmission apparatus adopting an SDH (Synchronous Digital Hierarchy).

2. Description of the Related-art

The SDH is used as a SONET (Synchronous Optical Network) in North America. Thus, in this application, a word "SDH" refers to the SDH in general including a modification of the SDH used in North America. More than ten years have passed since a transmission device adopting the SDH was originally made. However, at the beginning, there were a number of technical fields in which no recommendation was set forth by the ITU-T (International Telecommunication Union-Telecommunication Standardization Sector), and thus each manufacturer adopted its own schemes in such fields. Additionally, there had been no advice in a field related to a synchronization method until recent days.

Figure 1:
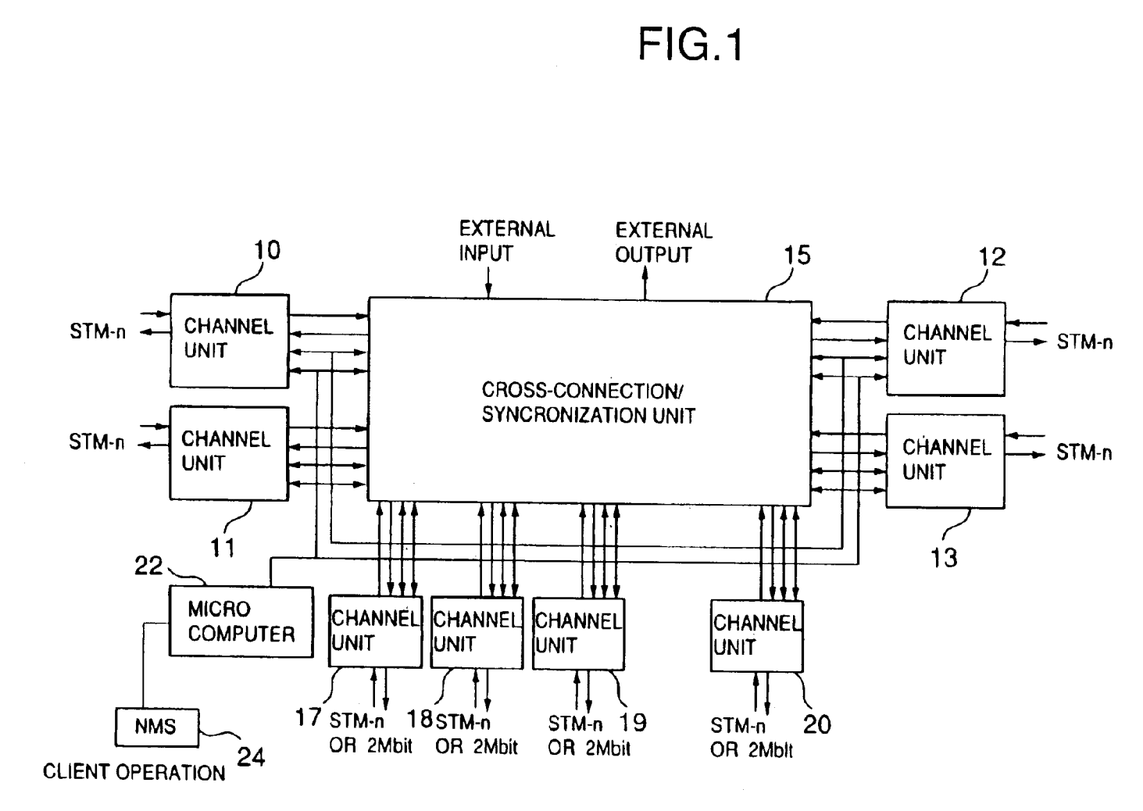
FIG. 1 is a block diagram showing a related-art SDH transmission apparatus.

FIG. 1 is a block diagram showing a related-art SDH transmission apparatus. The SDH transmission apparatus shown in FIG. 1 includes channel units 10 through 13 and 17 through 20, a cross-connection/synchronization unit 15, a microcomputer 22, and an NMS (Network Management System) 24. The channel units 10 through 13 are located on an aggregate side, and mainly execute high-speed transmission and reception of synchronous transport modules (STM-n). To be concrete, the channel units 10 through 13 supply synchronous transport modules received from the outside the SDH transmission apparatus to the cross-connection/synchronization unit 15, and transmit synchronous transport modules supplied from the cross-connection/synchronization unit 15 to the outside. The channel units 17 through 20 are located on a tributary side, and mainly execute low-speed transmission and reception of synchronous transport modules or 2 Mbps signals. To be concrete, the channel units 17 through 20 supply synchronous transport modules or 2 Mbps signals received from the outside to the cross-connection/synchronization unit 15, and transmit synchronous transport modules or 2 Mbps signals supplied from the cross-connection/synchronization unit 15 to the outside.

The cross-connection/synchronization unit 15 has a cross-connection function and a synchronization function. The cross-connection/synchronization unit 15 includes an external input terminal and an external output terminal as external interfaces for synchronization. The microcomputer 22 controls the entire SDH transmission apparatus, and manages interfaces between the SDH transmission apparatus and clients. The NMS 24 notifies the microcomputer 22 about client operations.

Figure 2:
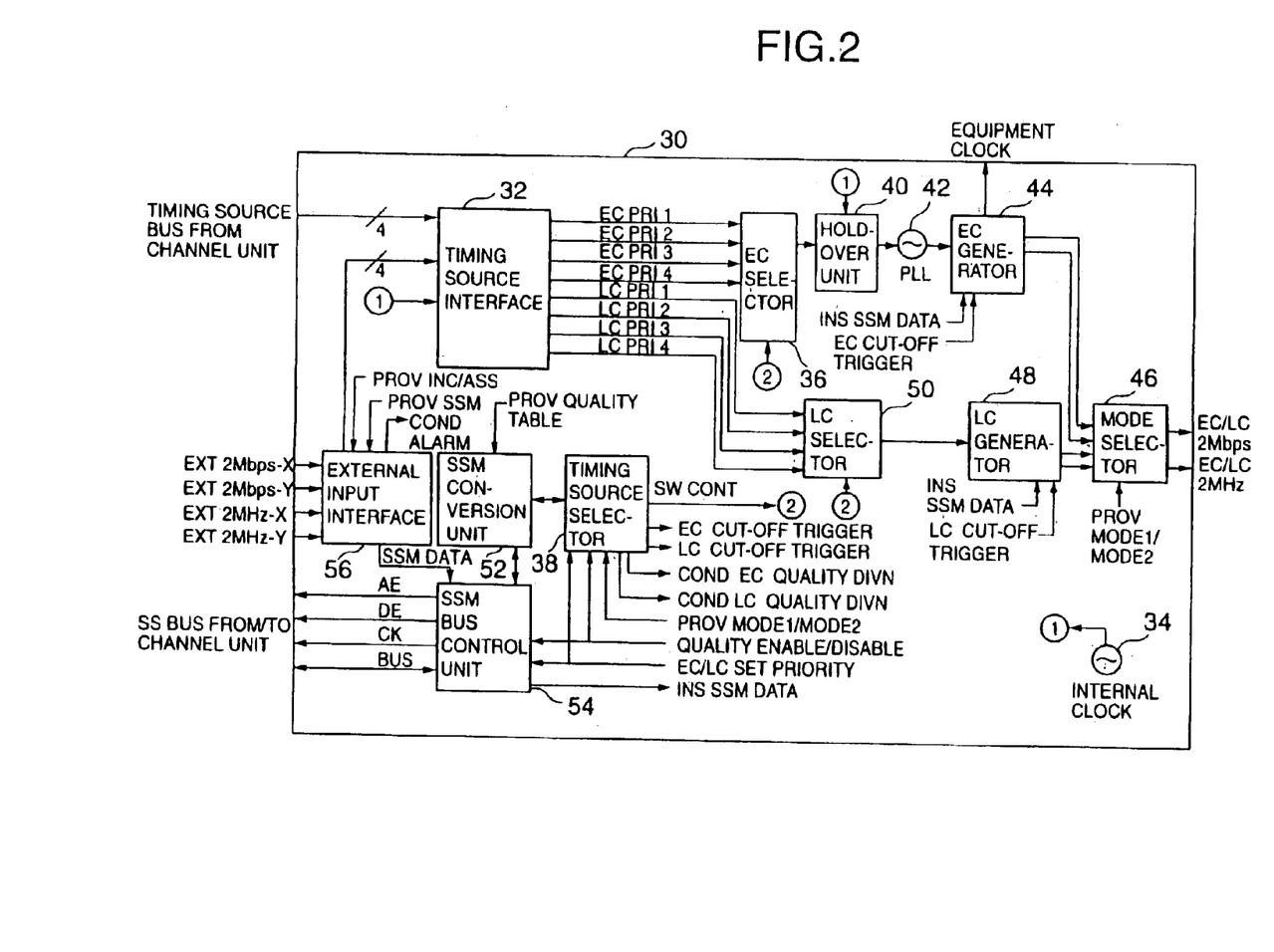
FIG. 2 is a block diagram showing a related-art synchronization unit included in the related-art SDH transmission apparatus.

The cross-connection/synchronization unit 15 additionally includes a synchronization unit 30 shown in FIG. 2. FIG. 2 is a block diagram showing a related-art synchronization unit 30 included in the cross-connection/synchronization unit 15 of the related-art SDH transmission apparatus. The synchronization unit 30 shown in FIG. 2 includes a timing source interface 32, an internal clock source 34, an EC (Equipment Clock) selector 36, a timing source selector 38, a holdover unit 40, a PLL (Phase-Lock Loop) circuit 42, an EC generator 44, a mode selector 46, an LC (Line Clock) generator 48, an LC selector 50, an SSM (Synchronization Status Message) conversion unit 52, an SSM bus control unit 54 and an external input interface 56.

The timing source interface 32 has an interface function for various types of timing signals. The internal clock source 34 is a fixed-rate clock oscillator generating an internal clock whose frequency is, for instance, 32.768 MHz±4.6 ppm. This internal clock is used as a timing source in addition to a clock for a holdover operation. The EC selector 36 selects a timing source or a clock extracted from a signal for an EC side, based on information supplied from the timing source selector 38. The holdover unit 40 provides a holdover function operating in a case in which all the timing sources on the EC side are unused. The PLL circuit 42 synchronizes an equipment clock EC to a timing source selected by the EC selector 36. The EC generator 44 generates the equipment clock having a frequency of 2 MHz (EC 2 MHz), and a signal (EC 2 Mbps) that has a specific bit pattern and a 2 Mbps transmission rate. The mode selector 46 selects an output signal of the mode selector 46 between a signal from the EC generator 44 and a signal from the LC generator 48, based on a provisioning item supplied from the microcomputer 22. The LC generator 48 generates a 2 MHz line clock (LC 2 MHz), and a signal (LC 2 Mbps) that has a specific bit pattern and a 2 Mbps transmission rate, both being synchronous to a timing source selected by the LC selector 50. The LC selector 50 selects a timing source for an LC side, based on information supplied from the timing source selector 38. The timing source selector 38 compares quality levels of timing sources whose priority orders are set, and controls selection of timing sources at the EC selector 36 and the LC selector 50. The SSM conversion unit 52 converts a value of an SSM indicating a synchronization condition of a received signal to a quality level. The SSM bus control unit 54 controls SSM buses. The external input interface 56 is an interface for 2 MHz clocks and 2 Mbps signals inputted to the synchronization unit 30 from outside.

An individual method has been utilized in the above-described synchronization function of the related-art SDH transmission apparatus since there had been no standard for the synchronization function until recent days. However, the ITU-T G.781 (Synchronization Layer Function) was recommended in June 1999, and thus, manufacturers now have necessity to follow the advice. To be concrete, in the related-art synchronization unit or function shown in FIG. 2, an incoming SSM function must be added to an external 2 Mbps SSM function used to include only an assumed SSM function, according to the advice. Additionally, an assumed SSM function must be added to an STM-n SSM function used to include only an incoming SSM function, according to the advice. A QL-Disable function, a "hold-off time" function and a "wait to restore" function must be added to a timing-source selecting function used to include a QL-Enable function, thereby renewing a state transition in the timing-source selecting function. Consequently, a current related-art synchronization function of an SDH transmission apparatus cannot follow the above-described ITU-T recommendation, unless it is modified.

SUMMARY OF THE INVENTION

Accordingly, it is a general object of the present invention to provide a transmission apparatus including a synchronization function. More particular object of the present invention is to provide a transmission apparatus including a synchronization function following the ITU-T G.781 Recommendation by utilizing a related-art synchronization function.

The above-described object of the present invention is achieved by a transmission apparatus utilizing an SDH (Synchronous Digital Hierarchy), including a processing unit controlling the transmission apparatus, an SSM (Synchronization Status Message) extraction unit extracting a first SSM from an input signal, and a selector selecting either of the first SSM and a second SSM set by the processing unit.

Accordingly, the transmission apparatus can add an incoming SSM function, for instance, to an external 2 Mbps SSM function in addition to an assumed SSM function.

The above-described object of the present invention is also achieved by a transmission apparatus utilizing an SDH including a processing unit controlling the transmission apparatus, an S1-byte extraction unit extracting a first SSM from an S1 byte of an input STM (Synchronous Transport Module) signal, a memory unit storing a second SSM set by the processing unit, and a selector selecting either of the first SSM and the second SSM.

Accordingly, the transmission apparatus can add an assumed SSM function.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 3:
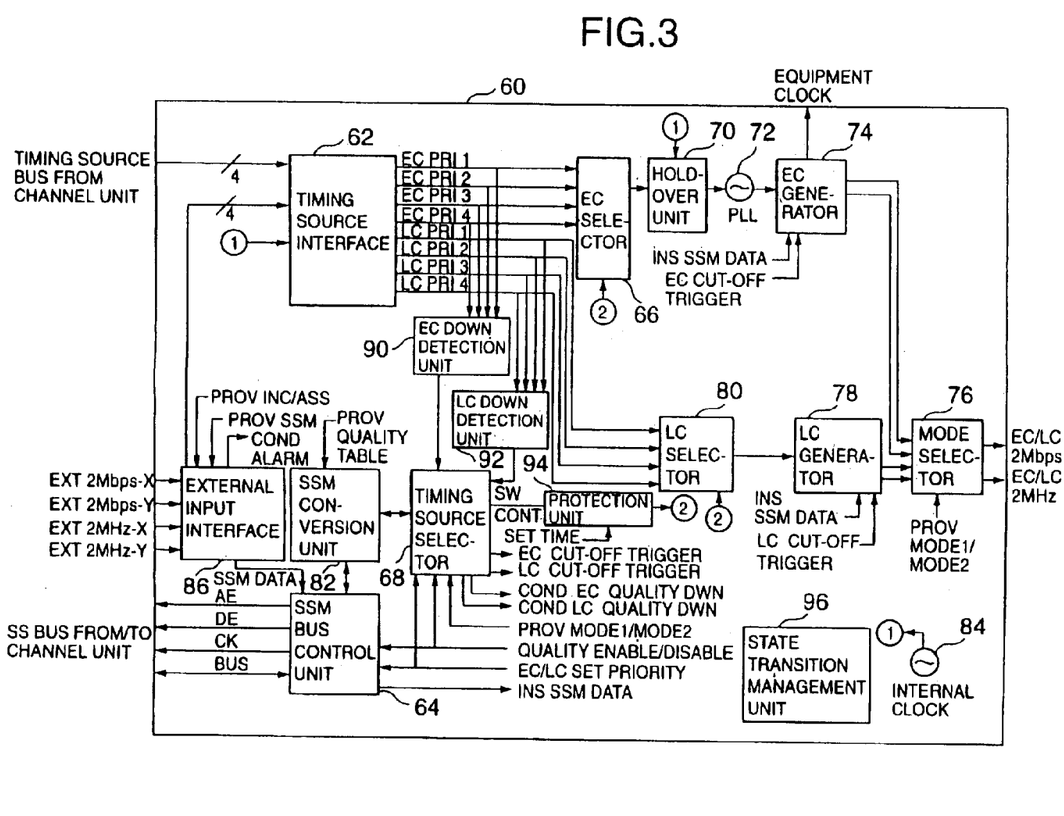
FIG. 3 is a block diagram showing a synchronization unit according to a first embodiment of the present invention.

FIG. 3 is a block diagram showing a synchronization unit 60 included in the cross-connection/synchronization unit 15 shown in FIG. 1, according to a first embodiment of the present invention. The synchronization unit 60 shown in FIG. 3 includes a timing source interface 62, an internal clock source 64, an EC (Equipment Clock) selector 66, a timing source selector 68, a holdover unit 70, a PLL (Phase-Lock Loop) circuit 72, an EC generator 74, a mode selector 76, an LC (Line Clock) generator 78, an LC selector 80, an SSM (Synchronization Status Message) conversion unit 82, an SSM bus control unit 84, an external input interface 86, an EC down detection unit 90, an LC down detection unit 92, a protection unit 94, and a state-transition management unit 96.

The timing source interface 62 has an interface function for various types of timing sources, and is supplied with the timing sources from channel units and the external input interface 86. Additionally, the timing source interface 62 supplies equipment clocks (ECs) having priority orders 1 through 4 (PRI 1 through PRI 4) to the EC selector 66, and line clocks (LCs) having priority orders 1 through 4 (PRI 1 through PRI 4) to the LC selector 80. The internal clock source 64 is a fixed-rate clock oscillator generating an internal clock whose frequency is, for instance, 32.768 MHz±4.6 ppm. This internal clock is used as a timing source in addition to a clock for a holdover operation. The EC selector 66 selects a timing source for an EC side, based on information supplied from the timing source selector 68. The holdover unit 70 supplies a holdover function operating in a case in which all the timing sources on the EC side are unused. The PLL circuit 72 synchronizes an equipment clock EC to a timing source selected by the EC selector 66. The EC generator 74 generates the equipment clock having a frequency of 2 MHz (EC 2 MHz), and a signal (EC 2 Mbps) that has a 2 Mbps transmission rate. The mode selector 76 selects an output signal of the mode selector 76 between a signal from the EC generator 74 and a signal from the LC generator 78, based on a provisioning signal. The LC generator 78 generates a 2 MHz line clock (LC 2 MHz), and a signal (LC 2 Mbps) that has a 2 Mbps transmission rate, both being synchronous to a timing source selected by the LC selector 80. The LC selector 80 selects a timing source for an LC side, based on information supplied from the timing source selector 68. The timing source selector 68 compares quality levels (QL) of timing sources whose priority orders are set, generates a selecting (switching) control signal (SW CONT). Subsequently, the switching control signal is supplied to the EC selector 66 and the LC selector 80 through the protection unit 94 so that the EC selector 66 and the LC selector 80 can select appropriate timing sources. The SSM conversion unit 82 converts a value of an SSM indicating a synchronization condition of a received signal to a quality level for convenience, and supplies the quality level to the timing source selector 68. The SSM bus control unit 84 controls SSM buses. The external input interface 86 is an interface for 2 MHz clocks and 2 Mbps signals inputted to the synchronization unit 60 from outside.

Figure 4:
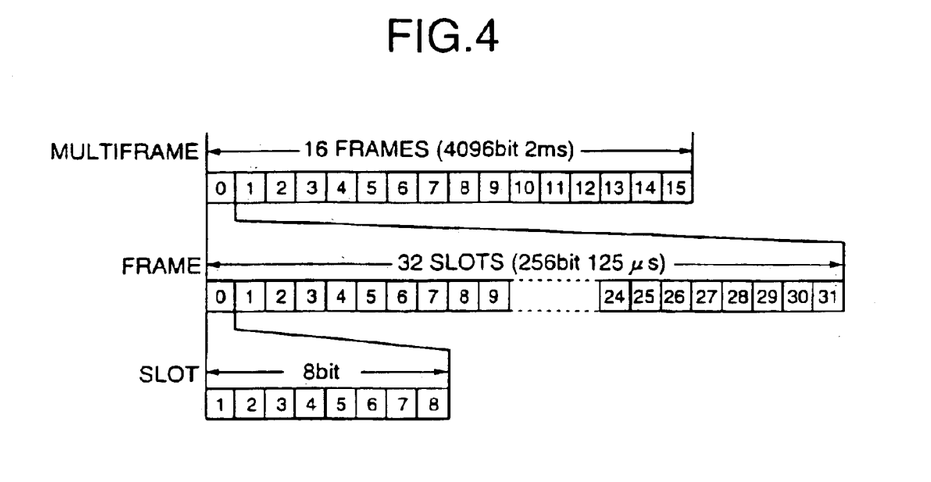
FIG. 4 is a diagram showing a frame structure of an external 2 Mbps signal.

A description will now be given of an SSM function performed on an external 2 Mbps signal inputted to the synchronization unit 60. A frame structure of the external 2

Figure 5:
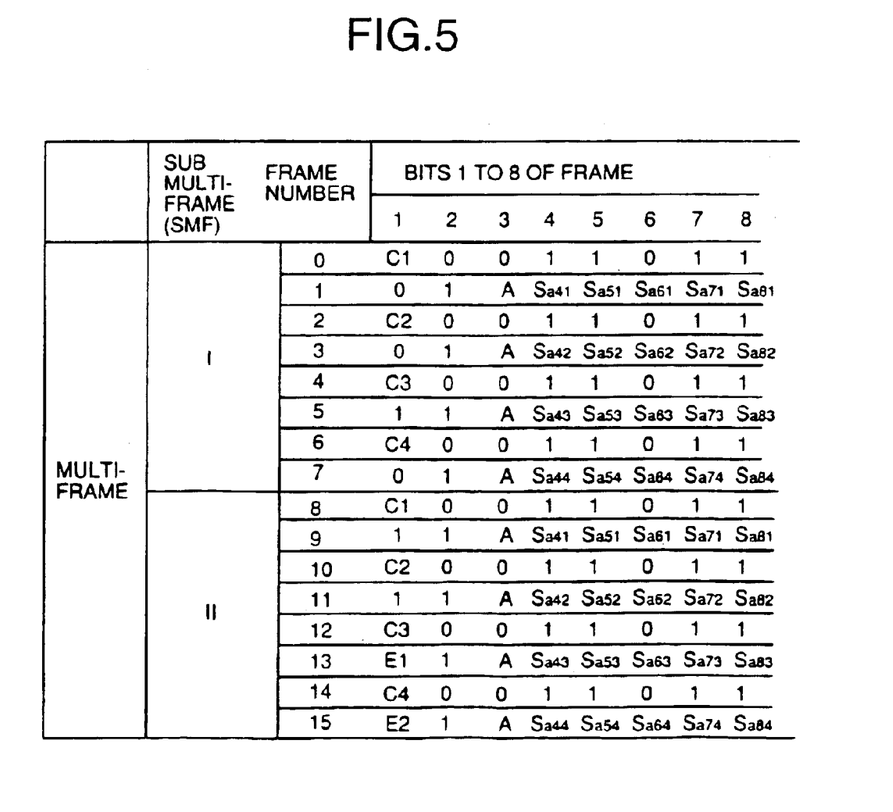
FIG. 5 is a diagram showing a first time slot 0 of each frame included in the external 2 Mbps signal.

Mbps signal is shown in FIG. 4. A 2 Mbps multiframe includes 16 frames, in which the upper 8 frames are called a sub multiframe I, and the lower 8 frames are called a sub multiframe II. Each frame of the multiframe includes 32 timeslots, in which an OHB (OverHead Bit) and a frame pattern including an FAS (Frame Alignment Signal) and an NFAS are added to the first timeslot 0. FIG. 5 is a diagram showing the first time slot 0 of each frame included in the multiframe. bits E1 and E2 shown in FIG. 5 are error indication bits of a CRC-4 (Cyclic Redundancy Check-4). A bit "A" is a RAI (Remote Alarm Indication) bit. Bits C1 through C4 are CRC-4 bits. Additionally, bits $Sa_{41}$ through $Sa_{84}$ are spare bits used for transmission and reception of an SSM. An SSM is set to 4 bits, which are a bit $Sa_{n1}$ through a bit $Sa_{n4}$ of each sub multiframe (SMF) where "n" is one of 4 through 8. The most significant bit (MSB) and the least significant bit (LSB) of the SSM are respectively the bit $Sa_{n1}$ and the bit $Sa_{n4}$. Extraction of an SSM including bits $Sa_{n1}$ through $Sa_{n4}$ depends on a client setting. The synchronization unit 60 needs to detect a same received SSM three times consecutively in order to validate the received SSM.

Figure 6:
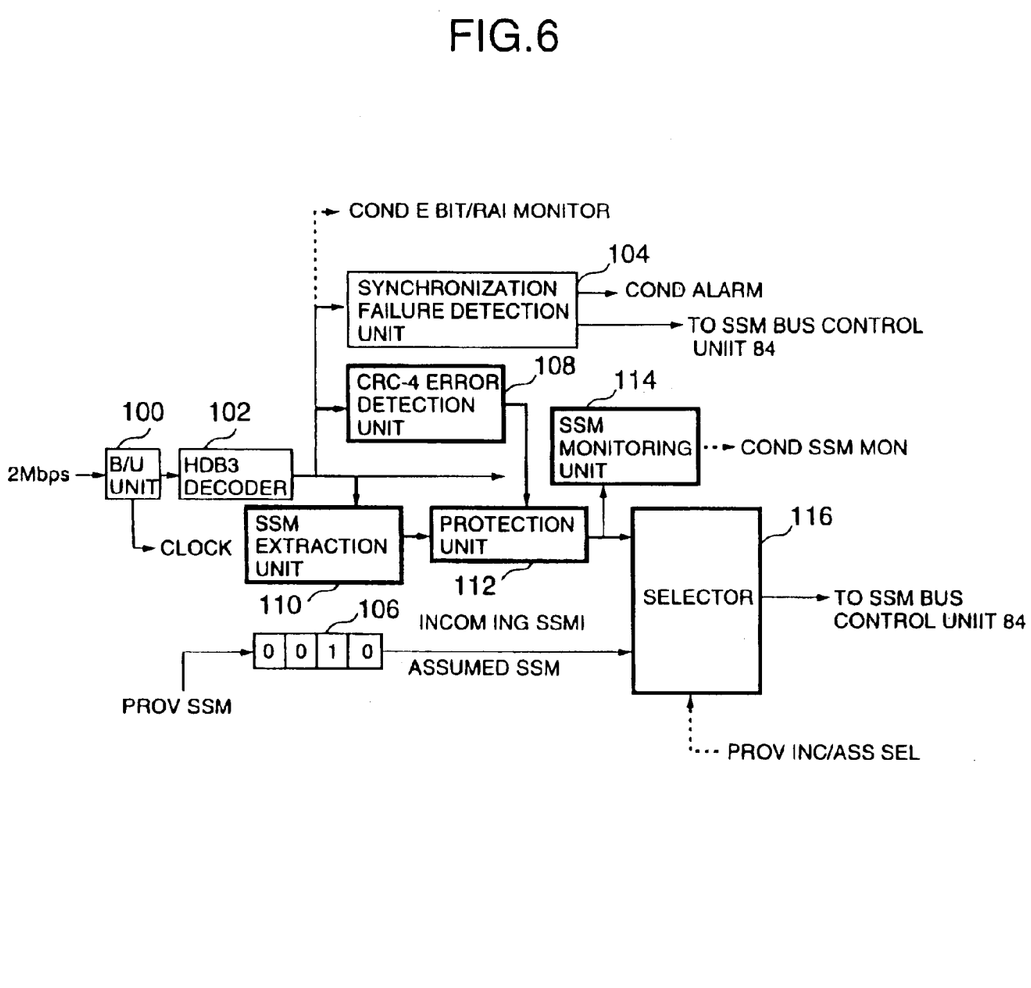
FIG. 6 is a block diagram showing an external 2 Mbps signal interface circuit according to a second embodiment of the present invention.
Figure 7:
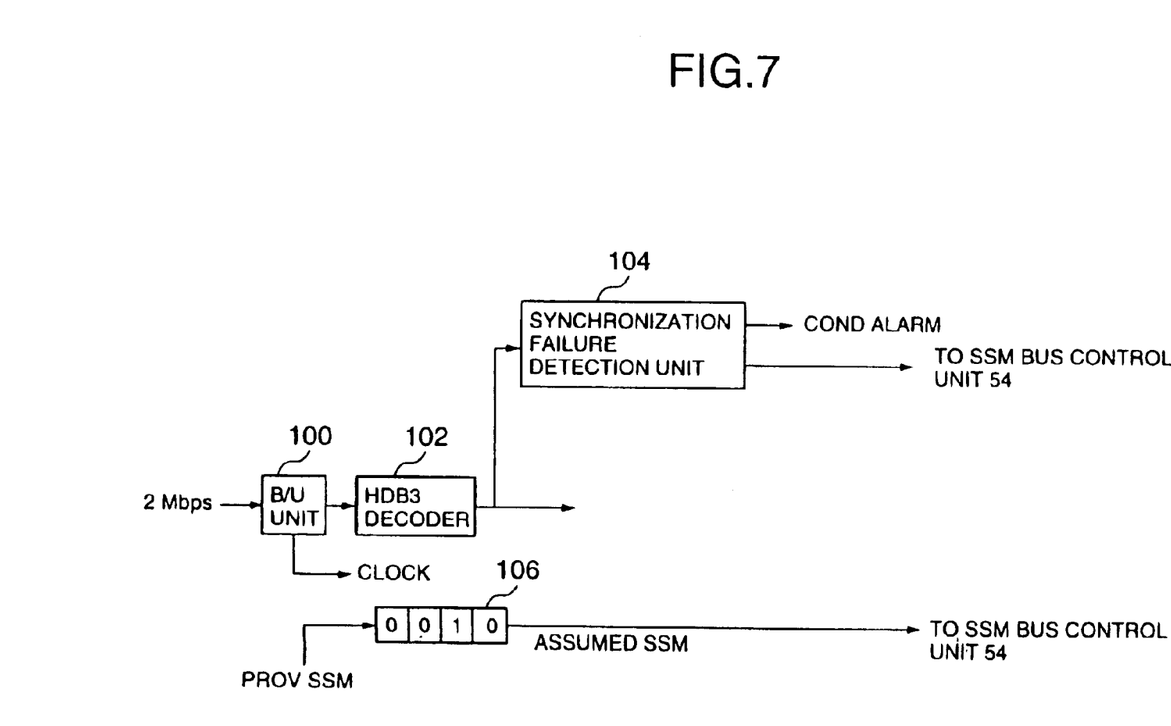
FIG. 7 is a block diagram showing a related-art external 2 Mbps signal interface circuit.

FIG. 6 is a block diagram showing an external 2 Mbps signal interface circuit according to a second embodiment of the present invention. The external 2 Mbps signal interface circuit is a part of the external input interface 86 shown in FIG. 3. Additionally, FIG. 7 is a block diagram showing a related-art external 2 Mbps signal interface circuit. A unit shown in FIG. 6 corresponding to a unit shown in FIG. 7 has a same unit number as the unit shown in FIG. 7. The external 2 Mbps signal interface circuit shown in FIG. 6 includes a B/U (Bipolar/Unipolar) unit 100, a HDB3 (High-Density Bipolar 3) decoder 102, a synchronization failure detection unit 104, a register 106, a CRC-4 error detection unit 108, an SSM extraction unit 110, a protection unit 112, an SSM monitoring unit 114 and a selector 116. In other words, the CRC-4 error detection unit 108, the SSM extraction unit 110, the protection unit 112, the SSM monitoring unit 114 and the selector 116 are added to the related-art external 2 Mbps signal interface circuit shown in FIG. 7, according to the second embodiment. The B/U unit 100 converts a 2 Mbps bipolar signal supplied from the outside to a 2 Mbps unipolar signal, and extracts a clock signal from the 2 Mbps bipolar signal. Since the 2 Mbps bipolar signal is encoded in the HDB3, the HDB3 decoder 102 decodes the 2 Mbps unipolar signal supplied from the B/U unit 100. The synchronization failure detection unit 104 detects synchronization failure in the decoded 2 Mbps unipolar signal, and then notifies the SSM bus control unit 84 of the synchronization unit 60 shown in FIG. 3 about the synchronization failure as well as supplies a synchronization-failure alarming signal to the microcomputer 22 shown in FIG. 1. The register 106 stores, for instance, a 4-bit assumed SSM value "0010" set by a provisioning item "PROV SSM" supplied from the microcomputer 22, and notifies the SSM bus control unit 84 about the assumed SSM value. The CRC-4 error detection unit 108 monitors the CRC-4 bits C1 through C4 of a multiframe included in the 2 Mbps unipolar signal, and notifies the protection unit 112 about an error when having detected the error in the CRC-4 bits C1 through C4. The SSM extraction unit 110 extracts SSM information set in the 2 Mbps unipolar signal, and supplies the SSM information to the protection unit 112. The protection unit 112 executes protection of a received SSM. To be concrete, the protection unit 112 checks whether values of three consecutively received SSMs are the same. By such protection, an SSM value equal for three consecutively received SSMS, is considered as a currently received "incoming SSM value".

This incoming SSM value is supplied from the SSM monitoring unit 114 to the microcomputer 22 as a conditioning item "COND SSM MON", and to the selector 116. The selector 116 selects either of the incoming SSM value supplied from the protection unit 112 and the assumed SSM value supplied from the register 106, based on a provisioning item "PROV INC/ASS SEL" supplied from the microcomputer 22, and outputs a selected value to the SSM bus control unit 84.

According to the second embodiment, the external 2 Mbps signal interface circuit (function) can obtain an incoming SSM function in addition to an assumed SSM function by including the SSM extraction unit 110 extracting an SSM from a spare bit of an input signal, for instance, a signal having a 2 Mbps transmission rate, and the selector 116 selecting one of the SSM extracted from the input signal and an SSM set by the microcomputer 22. Additionally, the external 2 Mbps signal interface circuit can obtain an accurate SSM by including the protection unit 112 validating an SSM if the SSM is extracted by the SSM extraction unit 110 consecutively for three times.

Figure 8:
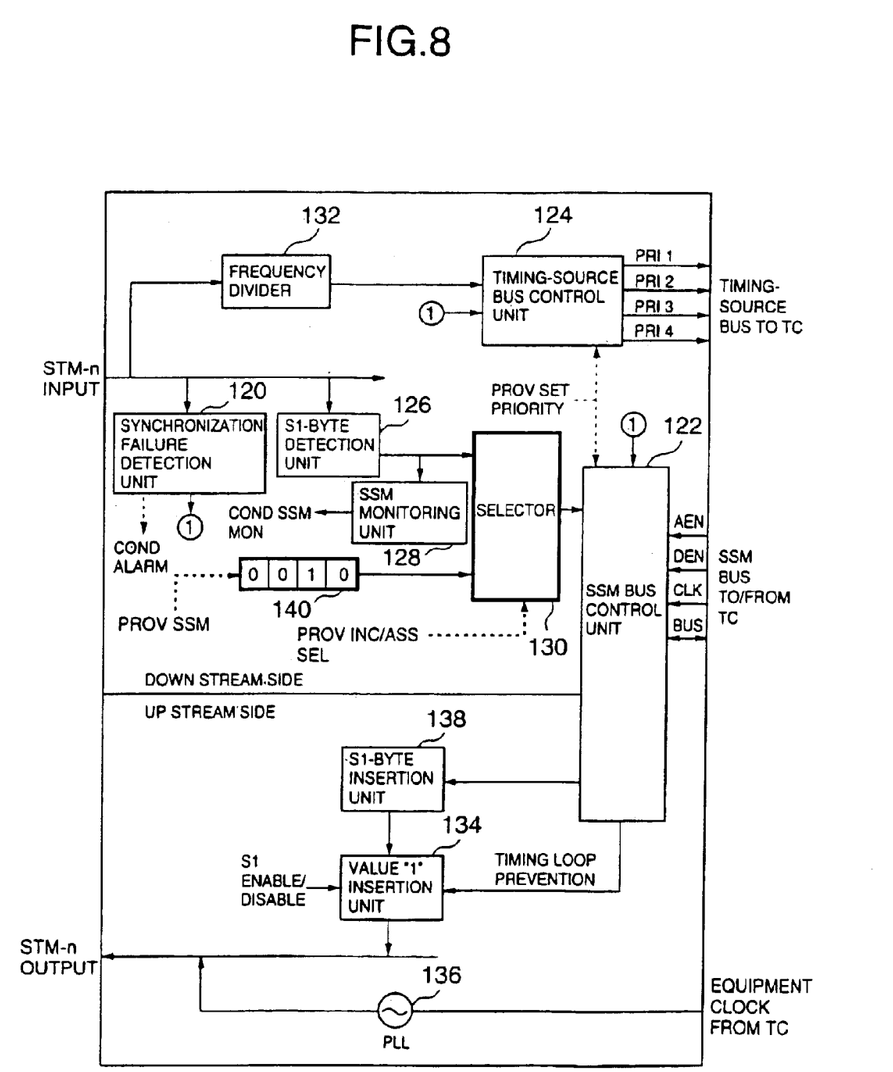
FIG. 8 is a block diagram showing a channel unit on an aggregate side according to a third embodiment of the present invention.
Figure 9:
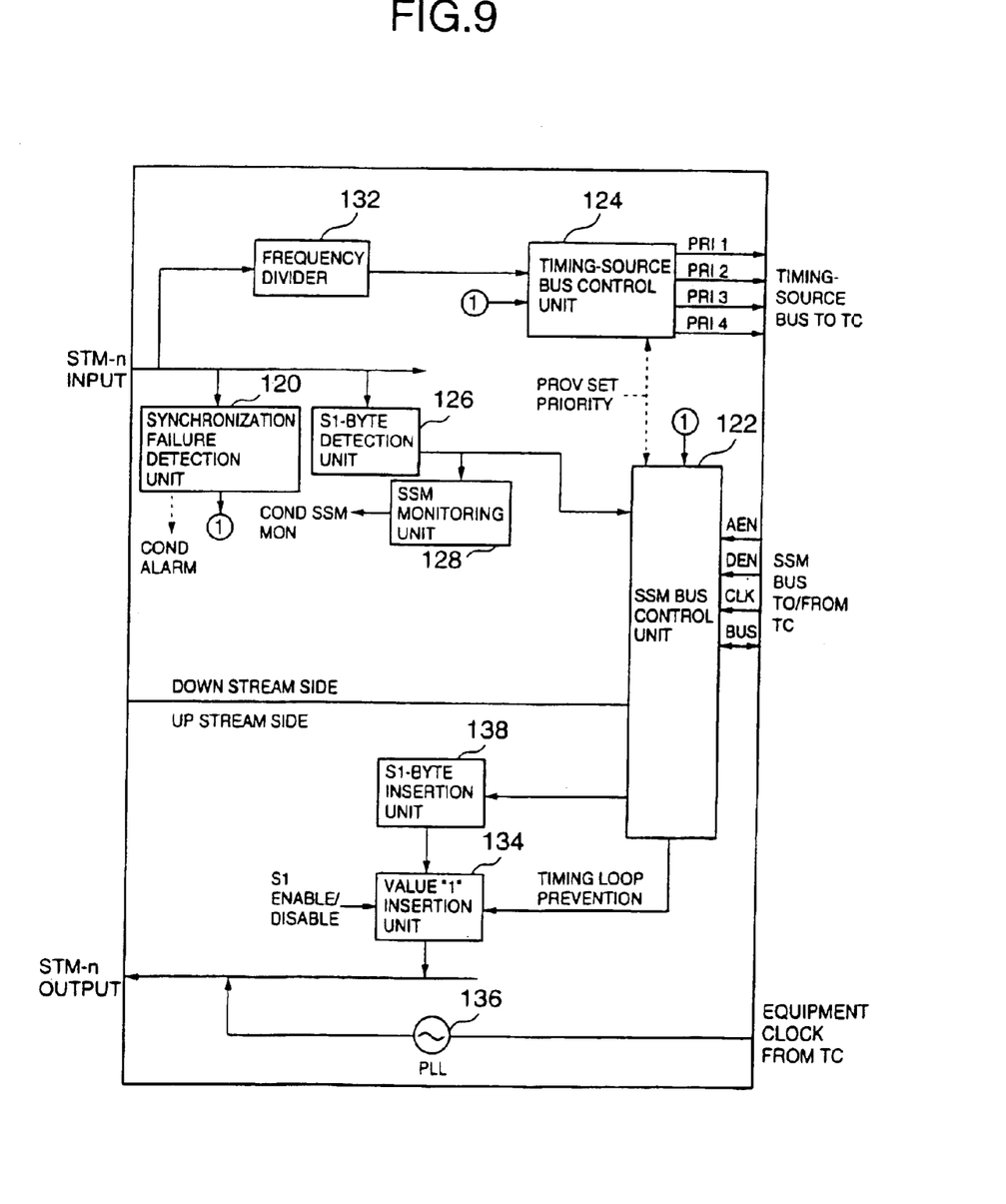
FIG. 9 is a block diagram showing a related-art channel unit on the aggregate side.
Figure 10:
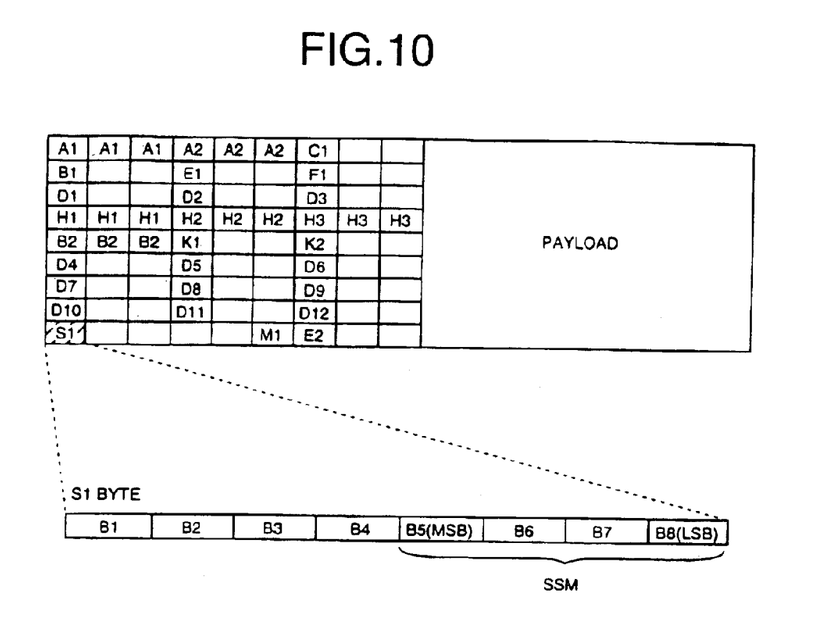
FIG. 10 is a diagram showing a format of a synchronous transport module STM-n.

FIG. 8 is a block diagram showing a channel unit on the aggregate side of the SDH transmission apparatus, according to a third embodiment of the present invention. FIG. 9 is a block diagram showing a related-art channel unit on the aggregate side of the SDH transmission apparatus. A unit shown in FIG. 8 corresponding to a unit shown in FIG. 9 has a same unit number as the unit shown in FIG. 9. The channel unit shown in FIG. 8 includes a synchronization failure detection unit 120, an SSM bus control unit 122, a timing-source bus control unit 124, an S1-byte extraction (detection) unit 126, an SSM monitoring unit 128, a selector 130, a frequency divider 132, a value "1" insertion unit 134, a PLL circuit 136, an S1-byte insertion unit 138 and a register 140. The selector 130 and the register 140 are added to the related-art channel unit shown in FIG. 9, according to the third embodiment. The synchronization failure detection unit 120 detects synchronization failure in a synchronous transport module STM-n, and then outputs a conditioning item "COND ALARM" as well as notifies the SSM bus control unit 122 and the timing-source bus control unit 124 about the synchronization failure. The S1-byte extraction unit 126 extracts an S1 byte, that is, an SSM value, included in an MSOH (Multiplex Section OverHead) of the synchronous transport module STM-n, and supplies the SSM value as an incoming SSM value to the SSM monitoring unit 128 and the selector 130. The SSM monitoring unit 128 outputs the SSM value as a conditioning item "COND SSM MON". It should be noted that the SSM value of the synchronous transport module STM-n (n=1, 4, 16) is transmitted to the SDH transmission apparatus by use of an S1 byte included in an MSOH of a synchronous transport module STM-n shown in FIG. 10. Bits B5 through B8 of the S1 byte shown in FIG. 10 are defined as the SSM value, according to the ITU-T G.707 9.2.2.11 Recommendation. Bits B1 through B4 are not used in the third embodiment.

The frequency divider 132 divides a frequency of a clock signal extracted from an STM-n signal to 2.048 MHz as a timing source, and supplies the clock signal to the timing-source bus control unit 124. The SSM bus control unit 122 controls an SSM bus transmitting or receiving SSM information between the cross-connection/synchronization unit 15 and the channel unit shown in FIG. 8. The timing-source bus control unit 124 controls a timing-source bus, based on provisioning information. The PLL circuit 136 synchronizes the STM-n signal to the equipment clock by setting the equipment clock as a standard. The S1-byte insertion unit 138 inserts SSM information provided from the SSM bus control unit 122 to the S1 byte included in the MSOH of the STM-n signal. The value "1" insertion unit 134 sets all the bits of the SSM information to be inserted to the S1 byte included in the MSOH of the STM-n signal to "1", based on a provisioning item "S1 ENABLE/DISABLE", and information from the SSM bus control unit 122. According to the ITU-T G.781 5.4.3 Recommendation, an assumed SSM function must be provided for a timing source of the synchronous transport module STM-n. Thus, the selector 130 and the register 140 are added to the related-art channel unit shown in FIG. 9. The register 140 stores an assumed SSM value, for instance, a value "0010", based on the provisioning item "PROV SSM" supplied from the microcomputer 22. The selector 130 selects either of the incoming SSM value supplied from the S1-byte extraction unit 126 and the assumed SSM value supplied from the register 140, and supplies a selected value to the SSM bus control unit 122.

According to the third embodiment, the channel unit can add an assumed SSM function to an incoming SSM function as an STM-n SSM function by including the S1-byte extraction unit 126 extracting an SSM from an S1 byte of an input synchronous transport module signal, the register 140 storing an SSM set by the microcomputer 22, and the selector 130 selecting one of the SSM supplied from the S1-byte extraction unit and the SSM supplied from the register 140.

A QL-Enable (Quality Level Enable) function is provided in the related-art channel unit, the QL-Enable function constantly monitoring a quality level converted from an SSM value, and switching a timing source based on a change in the quality level. On the other side, in a channel unit regarding the ITU-T G.781 5.12.2 Recommendation, a QL-Disable function is also required in addition to the QL-Enable function. The QL-Enable function switches a timing source, by taking various factors including a quality level converted from an SSM value, a "Signal Fail via QL-Failed", that is, a condition in which all the bits in the SSM value is "1" so that an SSM signal cannot be used, a priority order by which the QL-Enable function selects a timing source that has the highest priority order among a plurality of timing sources that have an identical quality level, and an external command such as a manual switch operation by a client. The QL-Disable function switches a timing source, by taking factors including a "Signal Fail", that is, the condition in which an SSM signal cannot be used, the priority order and the external command.

Figure 11:
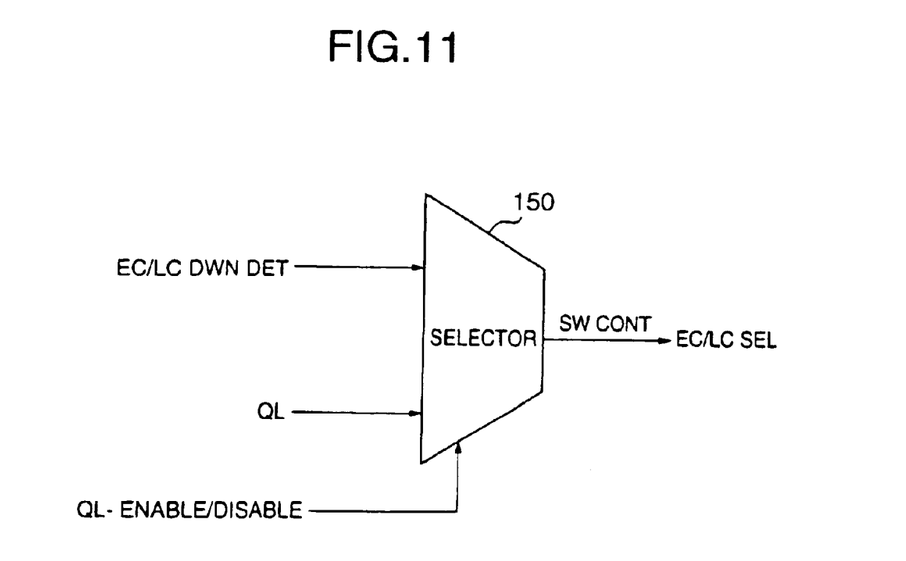
FIG. 11 is a block diagram showing a selector according to a fourth embodiment of the present invention.

The EC down detection unit 90 included in the synchronization unit 60 shown in FIG. 3 executes down detection of a plurality of timing sources outputted from the timing source interface 62 to the EC selector 66, and supplies an EC down detection signal (EC DWN DET) to the timing source selector 68 if no timing source outputted to the EC selector 66 is available. The LC down detection unit 92 executes down detection of a plurality of timing sources outputted from the timing source interface 62 to the LC selector 80, and supplies an LC down detection signal (LC DWN DET) to the timing source selector 68. The timing source selector 68 includes a selector 150 according to a fourth embodiment of the present invention, as shown in FIG. 11. The selector 150 is supplied with the EC down detection signal "EC DWN DET" from the EC down detection unit 90 or the LC down detection signal "LC DWN DET" from the LC down detection unit 92, and a quality level QL from the SSM conversion unit 82. The selector 150 selects the quality level QL if a provisioning item supplied form the microcomputer 22 is "QL-Enable", and selects the EC down detection signal or the LC down detection signal if the provisioning item supplied from the microcomputer 22 is "QL-Disable", thereby executing switching control of the EC selector 66 and the LC selector 80.

According to the fourth embodiment, the synchronization unit 60 can add a QL-Disable function to a timing-source switch operation in addition to a QL-Enable function, by including a first switching unit, that is, a combination of the SSM conversion unit 82 and the timing source selector 68, a second switching unit, that is, a combination of the EC down detection unit 90, the LC down detection unit 92 and the timing source selector 68, and a third switching unit, that is, the selector 150.

Figure 12:
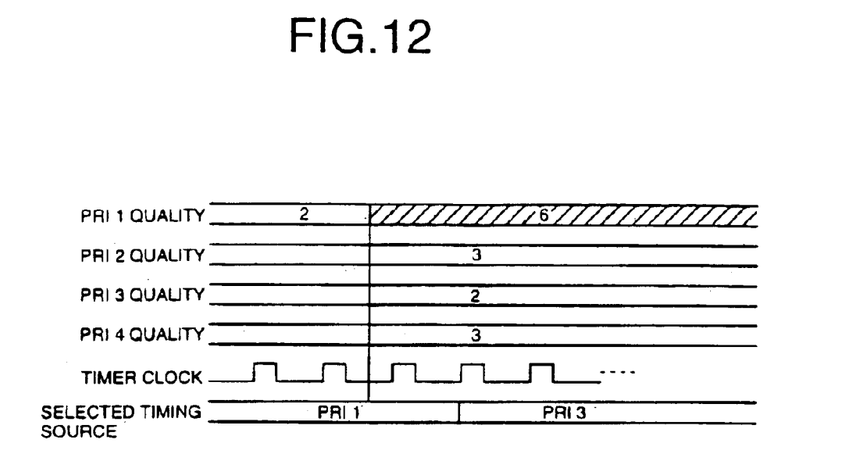
FIG. 12 is a diagram showing a first related-art timing source switching operation.
Figure 13:
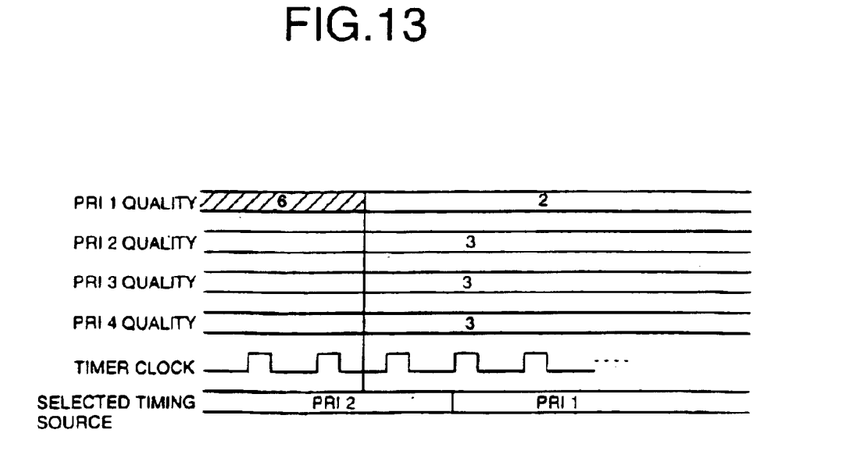
FIG. 13 is a diagram showing a second related-art timing source switching operation.

A related-art timing source selection (switch) is an instant operation executed in two timer-clock cycles, as shown in FIG. 12. Additionally, a related-art timing source switch back is also an instant operation executed in two timer-clock cycles, as shown in FIG. 13. However, according to the ITU-T G.781 5.8 Recommendation, "Hold-off Time" and "Wait to Restore Time" operations are required in order to prevent execution of switching and switching back operations for failure occurring for a short period. Thus, the protection unit 94 is provided between the timing source selector 68, and the EC selector 66 and the LC selector 80, according to the present invention. The protection unit 94 protects a switching control signal for a setting time, and then supplies the switching control signal to the EC selector 66 and the LC selector 80.

Figure 14:
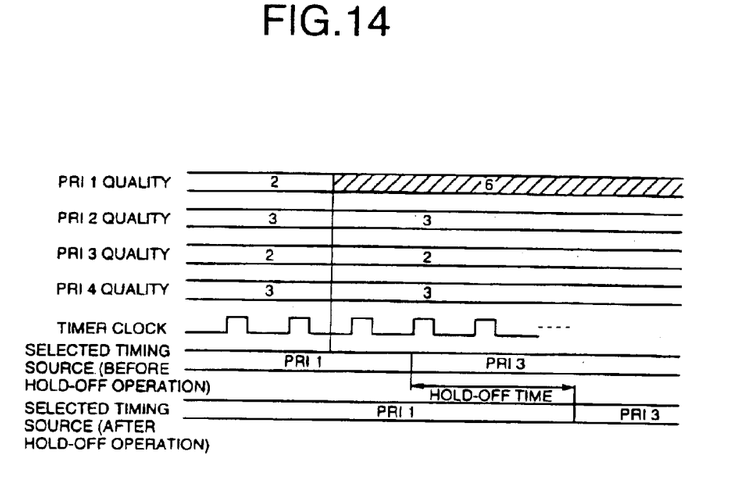
FIG. 14 is a diagram showing a first timing source switching operation according to a fifth embodiment of the present invention.

FIG. 14 is a diagram showing a timing source switching operation according to a fifth embodiment of the present invention. The timing source selector 68 compares a quality level of each signal having a priority order with other signals, and generates a switching control signal selecting a signal having the least quality level, as shown in FIG. 14. At first, the timing source selector 68 selects a signal PRI1 whose priority order is "1". However, when the quality level of the signal PRI1 changes from "2" to "6", the timing source selector 68 generates a switching control signal selecting a signal PRI3 whose quality level is "2", in two timer-clock cycles. Subsequently, the switching control signal selecting the signal PRI3 is supplied to the protection unit 94, and is protected by the protection unit 94 for a hold-off time. After the hold-off time has passed, the switching control signal selecting the signal PRI3 is supplied to the EC selector 66 and the LC selector 80. The above-described hold-off time is a value set by the microcomputer 22.

Figure 15:
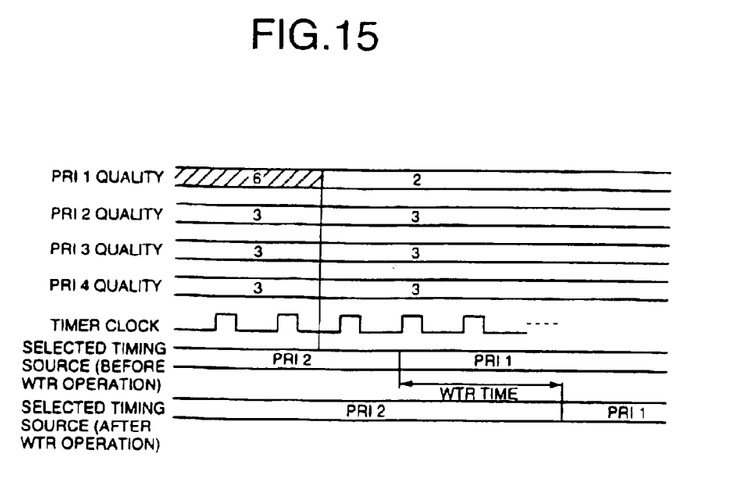
FIG. 15 is a diagram showing a second timing source switching operation according to a sixth embodiment of the present invention.

Additionally, FIG. 15 is a diagram showing a timing source switching back operation according to a sixth embodiment of the present invention. As shown in FIG. 15, the timing source selector 68 selects a signal PRI2 whose priority order is "2" at first. When the quality level of the signal PRI1 changes from "6" to "2", the timing source selector 68 generates a switching control signal selecting the signal PRI1 whose quality level is "2", in two timer-clock cycles. Subsequently, the switching control signal selecting the signal PRI1 is protected by the protection unit 94 for a "Wait To Restore" time (a WTR time), and is supplied to the EC selector 66 and the LC selector 80 after the WTR time has passed. The above-described WTR time is a value set by the microcomputer 22.

According to the fifth and sixth embodiment, the synchronization unit 60 can execute a timing-source switch operation and a timing-source switchback operation accurately. Additionally, the hold-off time and the WTR time can be set to any value by the microcomputer 22.

Figure 16:
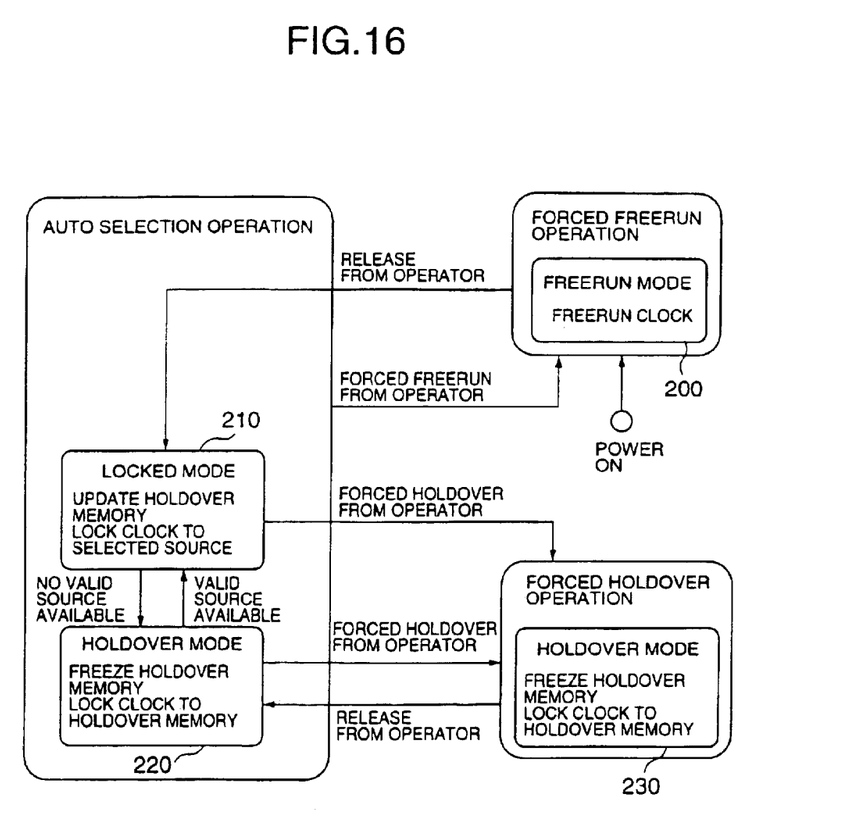
FIG. 16 is a diagram showing a state transition of the related-art synchronization unit.
Figure 17:
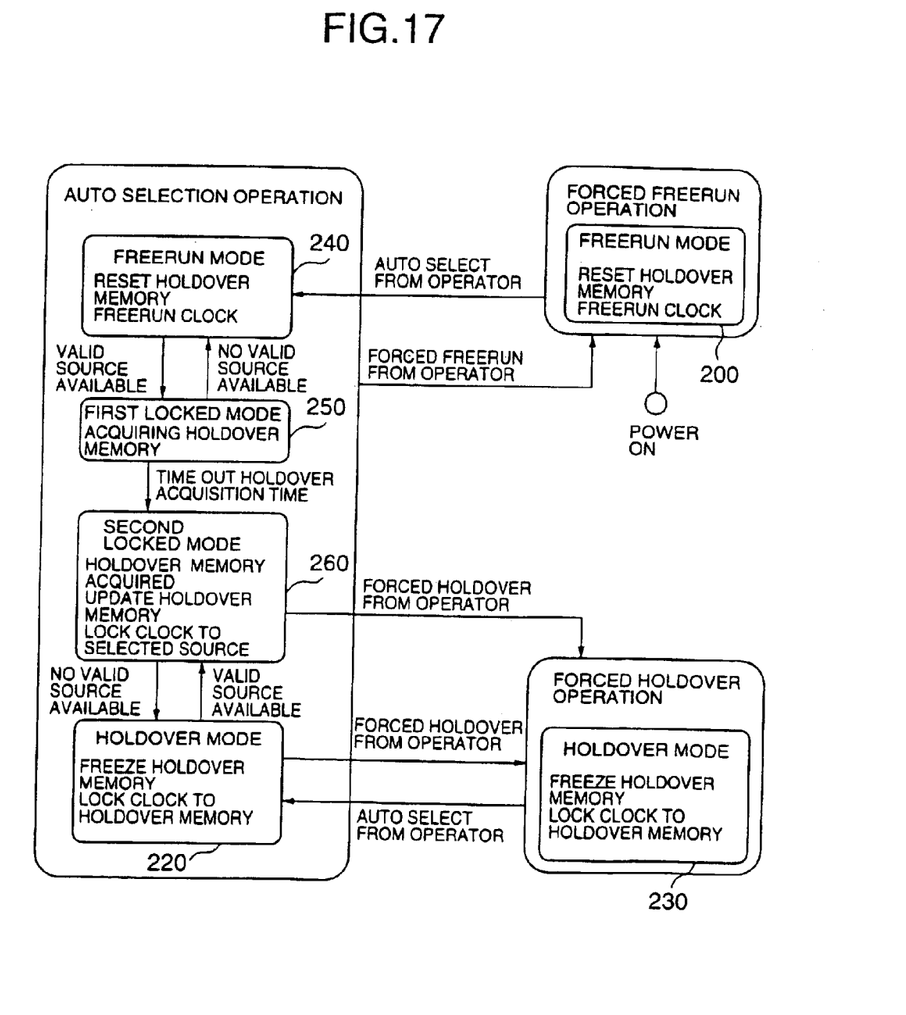
FIG. 17 is a diagram showing the state transition of the synchronization unit according to a seventh embodiment of the present invention.

FIG. 16 is a diagram showing a state transition of the related-art synchronization unit 30. The related-art synchronization unit 30 executes a state transition in various modes including a forced freerun operation mode 200, an auto selection operation mode including a locked mode 210 and a holdover mode 220, and a forced holdover operation mode 230, as shown in FIG. 16. On the other hand, FIG. 17 is a diagram showing the state transition of the synchronization unit 60 according to a seventh embodiment of the present invention. The synchronization unit 60 includes the freerun mode 200, an auto selection operation mode including a first locked mode 250, a second locked mode 260 and the holdover mode 220, and the forced holdover operation mode 230, according to the ITU-T G.781 6.3 Recommendation, as shown in FIG. 17.

At the state-transition management unit 96 included in the synchronization unit 60 shown in FIG. 3, an operation mode shifts to the forced freerun operation mode 200 forcibly selecting an internal clock when the synchronization unit 60 is powered on, or when a client or an operator directs a shift from the auto selection operation mode to the forced freerun operation mode 200. In the forced freerun operation mode, a memory used for a holdover operation is reset. It should be noted that the memory used for the holdover operation is included in the holdover unit 70. If the client inputs "AUTO SELECT" command, the operation mode shifts to the freerun mode 240 of the auto selection operation mode. This freerun mode 240 is a temporary mode set until a time at which the client inputs a timing source. In the freerun mode 240, the memory for the holdover operation is reset.

The first locked mode 250 is a mode in which the memory used for the holdover operation is being updated right after the client has set a priority order of timing sources. After the memory has been updated for one cycle so that the memory includes enough information for the timing sources, the operation mode shifts to the second locked mode 260. If all the timing sources inputted by the client have become usable while the memory has being updated (DNU), the operation mode shifts to the freerun mode 240. In the second locked mode 260, the memory is updated constantly. If all the timing sources whose priority orders set by the client have become usable, the operation mode shifts from the second locked mode 260 to the holdover mode 220. The holdover mode 220 is operated by use of information stored in the memory used for the holdover operation. In the holdover mode 220, update of the memory is stopped. If the memory is recovered, the operation mode shifts back to the second locked mode 260. In the forced holdover operation mode 250, a holdover timing is forcibly selected by a direction of the client from the auto selection operation mode. In the forced holdover operation mode 250, update of the memory used for the holdover operation is stopped. The selection of the holdover timing is determined by the information stored in the memory.

According to the seventh embodiment as described above, an auto selection freerun mode, an auto selection first locked mode and an auto selection second locked mode can be added to operation modes managed by the state-transition management unit 96.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-270733, filed on Sep. 6, 2000, the entire contents of which are hereby incorporated by reference.

What is claimed is:

1. A transmission apparatus utilizing an SDH (Synchronous Digital Hierarchy), comprising:
a processing unit controlling said transmission apparatus;
an SSM (Synchronization Status Message) extraction unit extracting a first SSM from an input signal; and
a selector selecting either of said first SSM and a second SSM set by said processing unit so that said second SSM is selected when a conversion of said first SSM is needed.

2. A transmission apparatus utilizing an SDH (Synchronous Digital Hierarchy), comprising:
a processing unit controlling said transmission apparatus;
an SSM (Synchronization Status Message) extraction unit extracting a first SSM from an input signal;
a selector selecting either of said first SSM and a second SSM set by said processing unit; and
a protection unit validating said first SSM after receiving said first SSM consecutively for a fixed number of times.

3. The transmission apparatus as claimed in claim 1, further comprising:
a first switching unit selecting a timing source among a plurality of timing sources by detecting a change in said first SSM;
a second switching unit selecting the timing source among said plurality of timing sources by detecting a condition in which all the timing sources are unavailable; and
a third switching unit selecting one of said first switching unit and said second switching unit for selecting the timing source.

4. The transmission apparatus as claimed in claim 3, further comprising a switch protection unit protecting a timing-source switch operation performed by said first switching unit or said second switching unit.

5. The transmission apparatus as claimed in claim 3, further comprising a switchback protection unit protecting a timing-source switchback operation performed by said first switching unit or said second switching unit.

6. A transmission apparatus utilizing an SDH (Synchronous Digital Hierarchy), comprising:
a processing unit controlling said transmission apparatus;
an S1-byte extraction unit extracting a first SSM (Synchronization Status Message) from an S1 byte of an input STM (Synchronous Transport Module) signal;
a memory unit storing a second SSM set by said processing unit; and
a selector selecting either of said first SSM and said second SSM so that said second SSM is selected when a conversion of said first SSM is needed.

* * * * *